United States Patent [19]

Schmidt et al.

[11] Patent Number: 5,071,946

[45] Date of Patent: Dec. 10, 1991

[54] EMULSIFIERS AND A PROCESS FOR THE PRODUCTION OF LARGE PARTICLE SIZE, HOMODISPERSE POLYMER DISPERSIONS USING THESE EMULSIFIERS

[75] Inventors: Adolf Schmidt, Cologne; Herbert Eichenauer, Dormagen; Karl-Heinz Ott, Leverkusen; Alfred Pischtschan, Kuerten, all of Fed. Rep. of Germany

[73] Assignee: Bayer Aktiengesellschaft, Leverkusen, Fed. Rep. of Germany

[21] Appl. No.: 509,514

[22] Filed: Apr. 16, 1990

[30] Foreign Application Priority Data

Apr. 25, 1989 [DE] Fed. Rep. of Germany ....... 3913509

[51] Int. Cl.$^5$ ..................... C08G 63/553; C08K 3/20; C07C 69/74
[52] U.S. Cl. .................................. 528/306; 524/461; 528/307; 560/116
[58] Field of Search ........................ 524/461; 528/307; 560/116

[56] References Cited

U.S. PATENT DOCUMENTS 4,539,390 9/1985 Jackson, Jr. et al. ............... 528/303

FOREIGN PATENT DOCUMENTS 1076319 7/1967 United Kingdom .

Primary Examiner—Joseph L. Schofer
Assistant Examiner—Wu C. Cheng
Attorney, Agent, or Firm—Connolly and Hutz

[57] ABSTRACT

Reaction products of 1 mol of a cycloaliphatic diol corresponding to formula I

HO—R—OH    I with 2 mols cycloaliphatic carboxylic anhydrides corresponding to formulae II and/or III

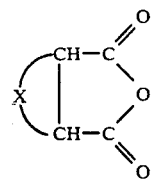

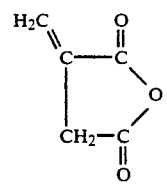

in which R is a cycloaliphatic hydrocarbon radical having 6 to 20 carbon atoms onto which the hydroxy groups are bonded directly or via methylene groups and X represents

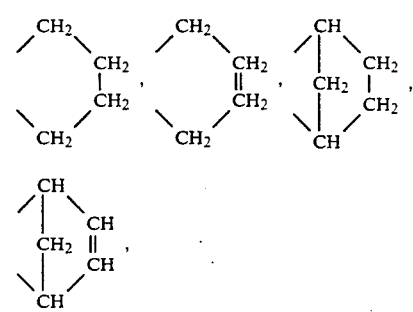

chemical bond obtainable by fusion of the cycloaliphatic diol and the cycloaliphatic carboxylic anhydride in an inert gas atmosphere at temperatures of from 100° C. to 250° C., and the alkali and ammonium salts of these reaction products, and their use as emulsifiers.

3 Claims, 2 Drawing Sheets magnification 20,000 times  1μm

EMULSIFIERS AND A PROCESS FOR THE PRODUCTION OF LARGE PARTICLE SIZE, HOMODISPERSE POLYMER DISPERSIONS USING THESE EMULSIFIERS

This invention relates to emulsifiers and to the production of large particle size, homodisperse polymer dispersions using these specific dispersion aids (emulsifiers) which show an unobvious effect.

In the context of the invention, "homodisperse" dispersions (latices) are those in which the latex particles have a narrow diameter distribution. Average latex particle diameters are defined for instance as average volume diameter DAV or as average number diameter DAN of the particles as follows:

$$DAV = \frac{\Sigma n_i \cdot D_i^4}{\Sigma n_i \cdot D_i^3}$$

$$DAN = \frac{\Sigma n_i \cdot D_i}{\Sigma n_i}$$

(c.f. DIN 53 206).

The DAV/DAN ratio may be regarded as defining uniformity.

"Large" particle size dispersions may be those wherein the average particle diameter DAN is from 150 to 600 nm and preferably from 250 to 450 nm. Latices having a DAV/DAN ratio of <1.15 may be called "homodisperse".

It is known that large particle size polybutadiene latices are required for the production of high-impact thermoplastic molding compounds (for example high-impact polystyrene, ABS polymers). Basically, coarsely divided (rubber) latices may be prepared using standard emulsifiers by the seed latex method (cf. Houben Weyl, Methoden der Organischen Chemie, Makromolekulare Stoffe, Part 1, 1961, Thieme Verlag Stuttgart, page 339).

Emulsifiers based on the naturally occuring resin acids ("resin soaps") have been used for the production of polybutadiene latices, butadiene-styrene copolymer latices, polychloroprene latices. However, "resin soaps" promote the formation of new latex particles, so that undesirable finely divided, even bimodal or polymodal latices are formed.

Accordingly, though resin soaps have proved to be suitable for the production of finely divided polybutadiene and butadiene-styrene copolymer latices having favorable natural color and processibility, they are less suited to the production of homodisperse, large particle size latices.

The present invention is based on the discovery that large particle size latices can readily be obtained by using special emulsifiers in the batch emulsion polymerization, semicontinuous emulsion polymerization and continuous seed emulsion polymerization processes known per se.

The present invention relates to reaction products of 1 mol of a cycloaliphatic diol corresponding to formula I

HO—R—OH     I with 2 mols cycloaliphatic carboxylic anhydrides corresponding to formulae II and/or III

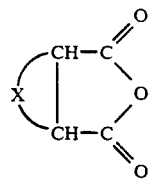
(II)

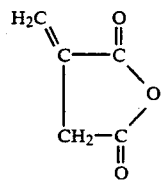
(III)

in which
R is a cycloaliphatic hydrocarbon radical containing 6 to 20 and preferably 6 to 15 carbon atoms, to which the hydroxy groups are attached directly or via methylene groups and
X represents

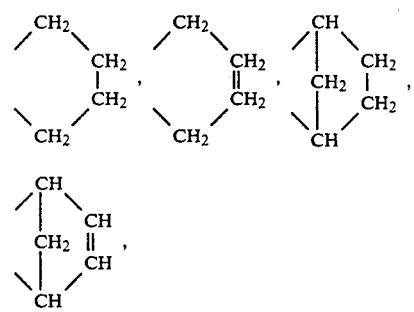

chemical bond
which reaction products are obtainable by fusion of the cycloaliphatic diol and of the cycloaliphatic carboxylic anhydride in an inert gas atmosphere at temperatures of from 100° C. to 250° C. and to the alkali and ammonium salts of these reaction products.

The invention also relates to their use as emulsifiers.

Reaction products of 1 mol (I) and 2 mols (II) or of 1 mol (I), 1 mol (II) and 1 mol (III) are preferred.

Figure 1:
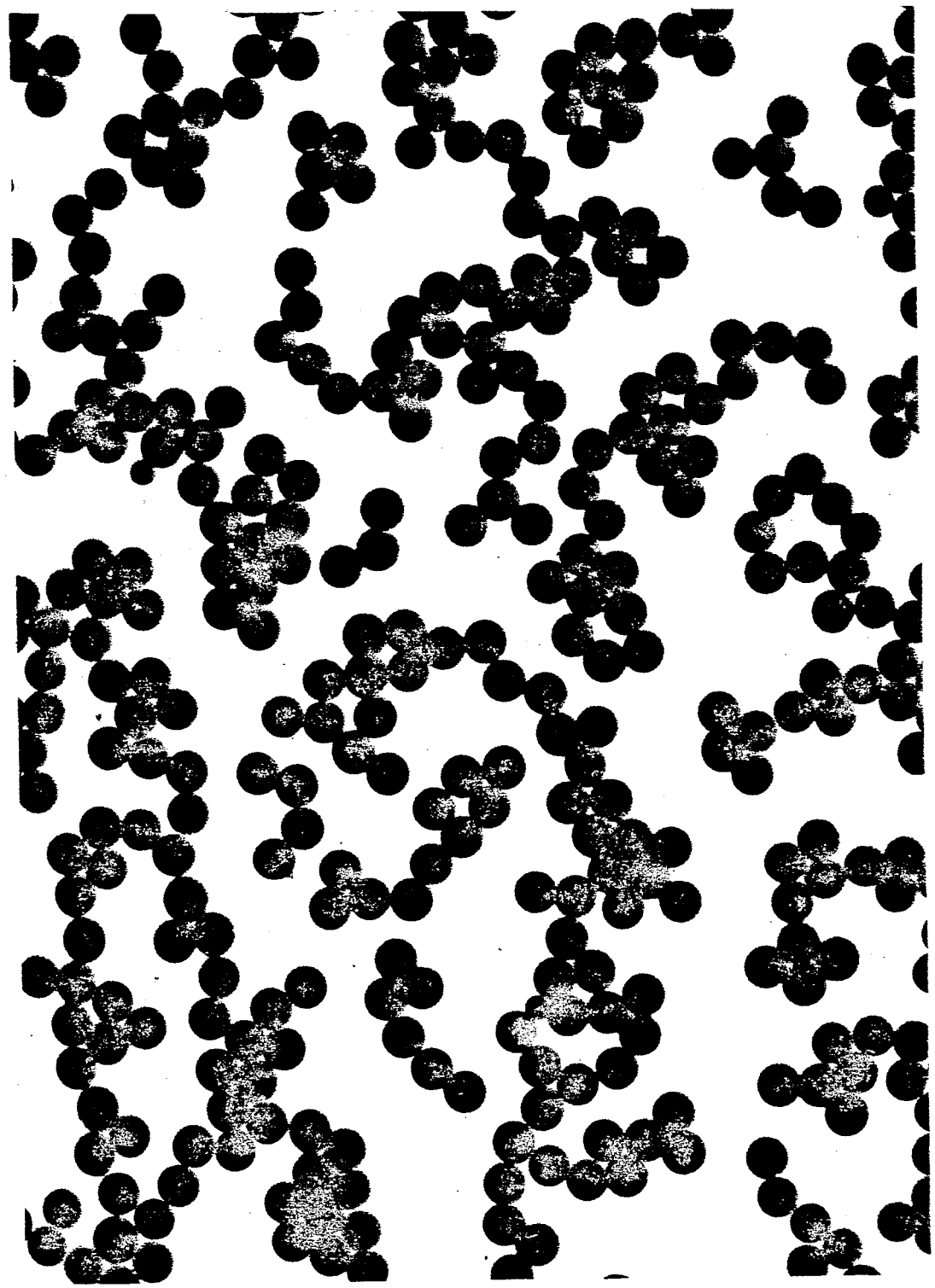
FIG. 1 is an electron micrograph, contrasted with osmium tetroxide, of latex particles prepared in accordance with the invention.

The new reaction products (emulsifiers) are alkali or ammonium salts of acidic resins which are obtained by reaction of 1 mol of a cycloaliphatic diol with 2 mol of a cycloaliphatic anhydride or with an anhydride mixture, for example by reaction of 1 mol of a cycloaliphatic diol with maleic anhydride and/or itaconic anhydride.

The reaction products according to the invention can be represented by the following general formula $Y_1$—O—R—O—$Y_2$     (IV)

in which the Y's independently represent

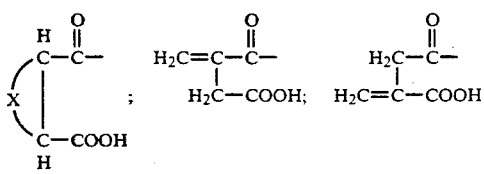

in which X and R are as defined above.

In formula (IV), R is a cycloaliphatic radical with two bonds, a "spacer" for the two, perferably dimetrically opposite, hydroxyl groups attached to the ring system either directly or via a methyl group.

The substituents R may be cycloaliphatic ring systems, for example, of 6-membered or 5-membered and 6-membered optionally alkyl-substituted rings. Such ring systems can readily be sythesized, for example, from dienes and dieneophiles by the DIELS-ALDER reaction. Preferred substituents R are:

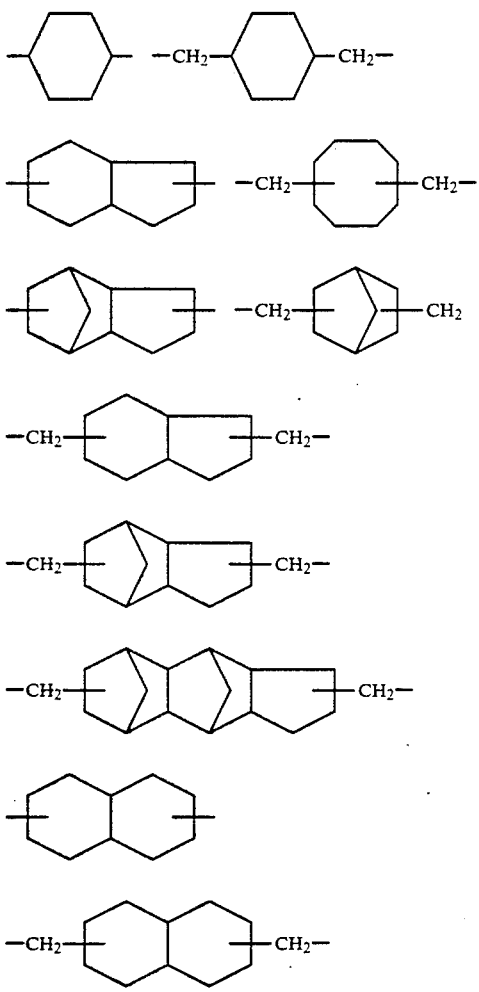

The diols required as starting product may be obtained in known manner by hydroformylation of cyclic dienes or of saturated aldehydes or alcohols with subsequent reduction of the aldehyde group (cf. Methodicum Chimicum, Kritische Übersicht bewahrter Arbeitsmethoden und ihre Anwendung in Chemie, Naturwissenschaft und Medizin (Critical Review of Proven Methods and their Application in Chemistry, Natural Science and Medicine), Ed. F. Korte, G. Thieme Verlag, Stuttgart, 1975, pages 212 to 215).

Other diols are obtained by hydrogenation of the corresponding aromatic compounds such as, for example, hydroquinone or by addition of water onto the corresponding diolefins.

Particularly suitable diols are 1,4-cyclohexanediol, 1,4-bis-hydroxymethyl cyclohexane, bis-hydroxymethyl hexahydro-4,7-methanoindane, (commercially available as "TCD-Diol" produced by hydroformylation of dicyclopentadiene) (U.S. Pat. No. 2,850,536), bis-hydroxymethylbicyclo-(4,3,0)-nonane, bis-hydroxymethyl norbornane, bis-hydroxymethyl cyclooctane, The diols mentioned are generally isomer mixtures.

Anhydrides which may be reacted with the diols mentioned include hexahydrophthalic anhydride, tetrahydrophthalic anhydride, 5-norbornene-2,3-dicarboxylic anhydride, norbornane dicarboxylic anhydride, maleic anhydride and itaconic anhydride.

The last two anhydrides are preferably reacted with the diols mentioned above in combination with saturated anhydrides. Copolymerizable emulsifiers are obtained.

The diols may preferably be reacted with the anhydrides in bulk (in the melt). With small batches, the diol may be mixed with the anhydride and reacted in the melt. With larger batches, the molten components are preferably added separately from one another to a melt of already formed reaction product. In most cases, it is also of advantage initially to introduce the anhydride or anhydride mixture and than to add the diol thereto. In the production of asymmetrical emulsifier acids, it is even possible to introduce the diol first and then to add the anhydride of formula II and, lastly, maleic or itaconic anhydride.

The reaction may be accelerated by small quantities of a tertiary amine, such as triethylamine or tributylamine. The end of the reaction may be recognized by determination of the acid value of the melt and from the disappearance of the anhydride band in the infrared spectrum. The reaction mixtures may be characterized by their acid value and by GPC analyses.

The reaction of the diols with the anhydrides is preferably carried out in an inert gas atmosphere at temperatures in the range from 100° to 250° C. and preferably at temperatures in the range from 100° to 200° C. Nitrogen or argon is preferably used as the inert gas.

The pure substances (isomers), e.g. those corresponding to the formulae shown in Table 1, do not have to be isolated from the reaction mixtures for the use as emulsifiers in accordance with the invention. The diolefins used for hydroformylation may themselves consist of mixtures. For example, dicyclopentadiene consists of a mixture of cis- and trans-Diels-Alder adduct. In the hydroformylation reaction, the number of isomers is further increased so that the diols used for reaction with the dianhydrides are generally mixtures of isomers. Accordingly, the formulae in Table 1, column 1, may be interpreted as isomer mixtures and the molecular weight in column 2 is that of the isomer mixture.

On completion of the reaction and after volatile constituents, particularly excess anhydrides, have been removed by distillation or sublimation, the reaction mixtures formed during the reaction of cyclic diols with the anhydrides mentioned are drained from the reactor while still hot and, after cooling, are comminuted to granulate or powder. In general, the reaction products are light resins with softening points above +20° C. Some of the resins show a tacky consistency reminiscent of natural resins. These properties of the emulsifiers may be desirable in the production of butadiene-styrene copolymers.

In the production of emulsion polymers comprising large particles, it is important to prevent formation of new particles during polymerization.

Formation of new particle in emulsion polymerization does not necessitate the existence of free micelles; new particles can also be formed when the quantity of emulsifier added is not sufficient for forming new micelles cf. A. S. Dunn in the Article "Emulsion Polymerization", pages 49-50, in Developments in Polymerization, Ed. by R. N. HAWARD, Applied Science Publishers Ltd. 1979).

How latex particles are formed is still not fully known (cf. N. Sütterlin, H. J. kurth, G. Markert, Makromolekulare Chemie 177, 1549-1565 (1976)), more especially page 1550, introduction, sentence 2).

It was neither foreseeable nor to be expected that the reaction products according to the invention are particularly suitable for the production of large particle size, homodisperse rubber latices, (e.g. polybutadiene latices) particularly where polymerization is carried out at elevated temperature in an alkaline medium. On the contrary, saponification and loss of emulsifier properties was expected.

It has now been found that stable, large particle size, homodisperse latices can be produced with the reaction products according to the invention as emulsifiers and that coagulate formation is no more pronounced than with conventional emulsifiers. Surprisingly, only a small quantity of emulsifiers according to the invention is required.

Examples of emulsifier acids according to the invention are shown in Table I, numbers 1 to 3, 5 and numbers 7 to 9. They are generally dicarboxylic acids of which the alkali (Li, Na, K, ammonium) salts are soluble in water and act as emulsifiers in emulsion polymerization. The Na or K salts are preferably used.

The emulsifier-acids according to the invention are soluble, particularly in powdered form, in aqueous alkali hydroxides. An excess of alkali hydroxide is not necessary for dissolution and should be avoided. However, since the emulsifiers according to the invention are mostly used in combination with potassium peroxodisulfate for the polymerization of olefinically unsaturated compounds and since protons are formed during the decomposition of potassium peroxodisulfate, it is advisable additionally to introduce water-soluble base in such a quantity that the polymerization takes place at pH 8-12 and preferably at pH 10.5-11.5.

Butadiene, styrene, mixtures of butadiene and styrene, mixtures of butadiene and acrylonitrile and sparingly water-soluble acrylates or methacrylates and also vinyl esters are mentioned in particular as monomers which may be polymerized to coarsely divided aqueous dispersions using the emulsifiers according to the invention. In addition, the new emulsifiers are also suitable for the polymerization of mixtures of acrylonitrile with styrene and/or α-methyl styrene. Halogen-containing monomers, such as vinyl chloride and chloroprene may also be polymerized, in which case polymers of increased particle diameter and improved thermal stability are obtained.

The emulsifiers according to the invention are also suitable for the production of graft rubber latices and, in particular, for the production of graft rubber latices based on polybutadiene or butadiene/styrene copolymers or butadiene/acrylonitrile copolymers, suitable graft monomers including, for example, styrene, α-methyl styrene, acrylonitrile, methyl methacrylate or mixtures of these monomers, preferably styrene and acrylonitrile in a ratio by weight of 95:5 to 60:40. Graft rubber latices of this type have rubber contents of 5 to 95% by weight and preferably 20 to 90% by weight and, after working up, for example by electrolyte coagulation and drying or by spray drying, may be converted into graft rubber powders which are suitable, for example, for the production of ABS polymers characterized by excellent thermal stability. ABS molding compounds of the type in question consist, for example, of 10 to 80% by weight and preferably 20 to 70% by weight of a graft rubber of styrene and acrylonitrile or methyl methacrylate on a particulate rubber having an average particle diameter $d_{50}$ of 0.05 to 2 μm and a rubber content of 20 to 90% by weight and of 90 to 20% by weight and preferably 80 to 30% by weight of a thermoplastic resin of 5 to 40 parts by weight acrylonitrile and 95 to 60 parts by weight styrene, α-methyl styrene, p-methyl styrene, methyl methacrylate or mixtures thereof.

Large particle size dispersions, more especially polybutadine dispersions, can be produced by standard emulsion polymerization processes. According to the invention, the new emulsifiers are used in the production of such dispersions. Where particularly homodisperse and large particle size latices are to be produced, a seed latex containing only a little emulsifier is initially introduced and monomers and aqueous emulsifier and initiator-solution is added continuously thereto.

Potassium peroxodisulfate is normally used as initiator, but redox systems of organic peroxides, reducing components and heavy metal traces, preferably in complexed form, may also be used. Other radical-forming compounds, such as azo-bis-isobutyronitrile and derivatives thereof containing water-solubilizing auxiliary groups, are also suitable.

TABLE I

| No. | Structural formula (not considering isomers) | °C. | Time | Molecular weight | Reaction mixture solidification point [°C.] | Acid value calc | Acid value found |
|---|---|---|---|---|---|---|---|
| 1. | (cyclohexyl-H-COOH)–COO–CH$_2$–[bicyclic]–CH$_2$–OOC–(cyclohexyl-H-COOH) | 110 | 3 | $C_{28}H_{40}O_8$: 504.6 | 50–54 | 222.4 | 228 |

TABLE I-continued

| No. | Structural formula (not considering isomers) | °C. | Time | Molecular weight | Reaction mixture solidif- point [°C.] | Acid value calc | Acid value found |
|---|---|---|---|---|---|---|---|
| 2. | (cyclohexyl-COOH)-COO-CH₂-[bicyclic]-CH₂-OOC-CH=CH-COOH | 110 | 3 | C₂₄H₃₂O₈:448.5 | 34–36 | 250.2 | 253 |
| 3. | (cyclohexenyl-COOH)-COO-CH₂-[bicyclic]-CH₂-OOC-(cyclohexenyl-HOOC) | 120 | 3 | C₃₀H₄₀O₈:528.6 | 47–50 | 212.3 | 220 |
| 4.* | (phenyl-COOH)-COO-CH₂-[bicyclic]-CH₂-OOC-(phenyl-HOOC) | 130 | 17 | C₂₈H₂₈O₈:492.5 | 48–52 | 227.9 | 200 |
| 5. | CH=CH(COOH)-COO-CH₂-[bicyclic]-CH₂-OOC-CH=CH-COOH | 110 | 4 | C₂₀H₂₄O₈:392.4 | 21–23 | 286 | 280 |
| 6.* | HOOC-CH₂-CH₂-COOCH₂-[bicyclic]-CH₂-COO-CH₂CH(HOOC) | 130 | 4 | C₂₀H₂₈O₈:396.4 | 7–10 | 283.1 | 283 |
| 7. | (cyclohexyl-COOH)-COO-CH₂-[bicyclic]-CH₂-OOC-C(=CH₂)(CH₂COOH) | 120 | 3 | C₂₅H₃₄O₈:462.5 | 20–23 | 242.6 | 250 |
| 8. | (cyclohexyl-COOH)-COO-(cyclohexyl)-OOC-(cyclohexyl-HOOC) | 120 | 3 | C₂₂H₃₂O₈:424.5 | 50–60 | 264.4 | 270 |
| 9. | (cyclohexyl-COOH)-COO-CH₂-(cyclohexyl)-CH₂-OOC-(cyclohexyl-HOOC) | 120 | 3 | C₂₄H₃₆O₈:452.5 | 46–50 | 248.0 | 255 |
| 10* | (cyclohexyl-COOH)-COO-(cyclohexyl)-CH-CH₂-C(CH₃)₂-(cyclohexyl)-OOC-(cyclohexyl-HOOC), with CH₃ | 150 | 4 | C₃₄H₅₄O₈:590.8 | 64–67 | 189.9 | 203 |

The reaction temperature and reaction time for the production of the acidic emulsifier resins are shown in columns 3 and 4
*does not correspond to the invention

EXAMPLES 1 to 36

The acidic emulsifier resins 1 to 3, 5 and 7 to 9 (according to the invention) and comparison resins 4, 6 and 10 are dissolved in the equivalent quantity, based on the measured acid value, of aqueous potassium hydroxide and adjusted to a solids content of 5% by weight. These resins are identified in Table I and were produced by melting together one mol of a cycloaliphatic diol and two mols of a cycloaliphatic anhydride.

Tables II to V show the polymerization results obtained where various monomers (styrene, n-butyl acrylate, vinyl versatate, ethyl acrylate) and various emulsifier resins are used. The average particle diameters $d_T$ shown were determined by turbidimetry (see H. Lange Kolloid-Z.Z. Polymere 223, 24–30 (1968)).

The emulsifier resins are less suitable for the polymerization of vinyl acetate, vinyl propionate and ethyl acrylate.

The polymerizations were carried out in corked, 500 ml glass bottles, which were rotated in a water bath for 15 hours at 70° C. in protective baskets, in the absence of oxygen (purging of the mixtures in the bottles with nitrogen or pure argon). The following recipe was used:

| | |
|---|---|
| Water | 95.9 parts by weight |
| 5% by weight emulsifier solution | 69.7 parts by weight |
| 1% Na₂CO₃ solution | 15.4 parts by weight |
| 1% K₂S₂O₈ solution | 26.1 parts by weight |
| Monomer | 87.1 parts by weight |
| Total parts by weight | 294.2 parts by weight |

At complete monomer conversion, latices having a solids content of 30.9% are obtained. In all tests, the emulsifier content is 4%, based on the monomer used, and the initiator content 0.3%, based on monomer.

Tables II to V show that, where emulsifiers of noninvention anhydrides or diols are used, either undesirably finely divided latices are obtained (see test 4, 9, 13, 18, 22, 27, 31 and 36) or coagulate is formed in very large amounts (see tests 6, 24 and 33). The emulsifiers based on formulae 1, 2 and 9 (cf. Table I), which lead to large particles and are also generally characterized by minimal coagulate formation, proved to be particularly advantageous in the case of styrene and also in the case of butadiene as discussed in the following Examples.

EXAMPLES 37

Seed Latex as Starting Material

A seed latex having an average particle size of approx. 100 nm is required for the following Examples. Its production is described in the following:

The following materials are introduced into a 6 liter stainless steel autoclave equipped with an infinitely

TABLE II

| | | Polymerization of styrene | | | |
|---|---|---|---|---|---|
| Example | Emulsifier used | % Solids of latex | Coagulate [g] | pH value | Particle diameter $d_T$ (nm) |
| 1 | Di-K-salt of 1 | 30.8 | 0.2 | 9.3 | 180 |
| 2 | Di-K-salt of 2 | 30.5 | 0.4 | 7.9 | 220 |
| 3 | Di-K-salt of 3 | 30.6 | <0.1 | 8.0 | 100 |
| 4* | Di-K-salt of 4 | 30.5 | <0.1 | 8.1 | 70 |
| 5 | Di-K-salt of 5 | 21.3 | 10 | 7.8 | 360 |
| 6* | Di-K-salt of 6 | 24.5 | large amount of coagulate | — | — |
| 7 | Di-K-salt of 8 | 29.5 | 5.3 | 9.8 | 600 |
| 8 | Di-K-salt of 9 | 30.4 | 1.5 | 9.3 | 290 |
| 9* | Di-K-salt of 10 | 30.8 | <0.1 | 9.2 | 70 |

*does not correspond to the invention

TABLE III

| | | Polymerization of n-butyl acrylate | | | |
|---|---|---|---|---|---|
| Example | Emulsifier used | % Solids of latex | Coagulate [g] | pH value | Particle diameter $d_T$ (nm) |
| 10 | Di-K-salt of 1 | 30.4 | 1.3 | 7.8 | 130 |
| 11 | Di-K-salt of 2 | 30.4 | 1.1 | 7.5 | 160 |
| 12 | Di-K-salt of 3 | 30.3 | 2.0 | 7.3 | 110 |
| 13* | Di-K-salt of 4 | 30.4 | <0.1 | 7.6 | 70 |
| 14 | Di-K-salt of 5 | 29.3 | 3.8 | 7.0 | 200 |
| 15* | Di-K-salt of 6 | 30.0 | 3.1 | 6.7 | 180 |
| 16 | Di-K-salt of 8 | 29.3 | 7.2 | 7.3 | 260 |
| 17 | Di-K-salt of 9 | 30.1 | 2.9 | 7.4 | 170 |
| 18* | Di-K-salt of 10 | 30.7 | 0.7 | 8.1 | 60 |

*does not correspond to the invention

TABLE IV

| | | Polymerization of vinyl versatate | | | |
|---|---|---|---|---|---|
| Example | Emulsifier used | % Solids of latex | Coagulate [g] | pH value | Particle diameter $d_T$ (nm) |
| 19 | Di-K-salt of 1 | 26.0 | 1.7 | 7.8 | 110 |
| 20 | Di-K-salt of 2 | 26.8 | 5.3 | 7.6 | 800 |
| 21 | Di-K-salt of 3 | 26.5 | 6.1 | 7.5 | 370 |
| 22* | Di-K-salt of 4 | 30.4 | 1.8 | 7.3 | 80 |
| 23 | Di-K-salt of 5 | coagulate | | | |
| 24* | Di-K-salt of 6 | coagulate | | | |
| 25 | Di-K-salt of 8 | 25.8 | 21.9 | 6.2 | 2200 |
| 26 | Di-K-salt of 9 | 28.0 | 10.6 | 6.2 | 1300 |
| 27* | Di-K-salt of 10 | 30.2 | 1.8 | 8.6 | 100 |

*does not correspond to the invention

TABLE V

| | | Polymerization of ethyl acrylate | | | |
|---|---|---|---|---|---|
| Example | Emulsifier used | % Solids of latex | Coagulate [g] | pH value | Particle diameter $d_T$ (nm) |
| 28 | Di-K-salt of 1 | 29.4 | 4.5 | 7.6 | 170 |
| 29 | Di-K-salt of 2 | 28.0 | 13.5 | 7.3 | 210 |
| 30 | Di-K-salt of 3 | 28.8 | 9.6 | 7.3 | 160 |
| 31* | Di-K-salt of 4 | 30.2 | 2.6 | 7.2 | 100 |
| 32 | Di-K-salt of 5 | 28.8 | 9.9 | 7.0 | 340 |
| 33* | Di-K-salt of 6 | 26.7 | 17.6 | 6.6 | 420 |
| 34 | Di-K-salt of 8 | 26.9 | 19.4 | 7.0 | 470 |
| 35 | Di-K-salt of 9 | 26.5 | 16.7 | 7.2 | 270 |
| 36* | Di-K-salt of 10 | 30.2 | 1.4 | 8.0 | 80 |

*does not correspond to the invention variable paddle stirrer and internal temperature control:

| | |
|---|---:|
| Deionized water | 2282.00 g |
| Na salt of disproportionated abietic acid (DRESINATE ® 731), 10% by weight in water | 388.00 g |
| Tert.-dodecyl mercaptan, 2.5% by weight | 6.00 g |
| $K_2S_2O_8$ solution in water | 155.00 g |
| Potassium hydroxide, solid (high purity) | 1.15 g |

The autoclave is evacuated and the reduced pressure is equalized with pure nitrogen (3 times). Butadiene is then introduced into the re-evacuated autoclave:

| | |
|---|---:|
| Butadiene | 1900.00 g |
| Rotational speed of the paddle stirrer: | 125 r.p.m. $[\text{min}^{-1}]$ |

The mixture is heated to 65° C. and polymerized for about 20 h until the pressure falls to 4 bar. Approx. 4.6 kg of an approx. 40% polybutadiene latex are obtained. The latex has an average particle diameter DAV of approx. 100 nm, as determined by the ultracentrifuge technique.

EXAMPLES 38 to 41

Comparison

Preparation of polybutadiene latices by seeded semi-continuous polymerization having a particle size of approx. 200 nm.

The polybutadiene latex prepared in accordance with Example 37 is initially introduced as seed latex and butadiene is added thereto in such a quantity that the average latex particle diameter is about doubled in the polymerization.

The polymerization formulations of Examples 38 to 41 for the various polymerization temperatures are shown in Table VI. The mixtures A are initially introduced, the autoclave is repeatedly evacuated and the vacuum is eliminated with nitrogen. After re-evacuation, butadiene (B) is introduced and the polymerization mixture is heated to the particular temperature (60° C. or 70° C. or 80° C. or 90° C.).

Emulsifier/activator solution C is added according to the conversion. One third of C is added at a solids content of the latex of 20% by weight, one third at a solids content of 30% by weight and the remainder at a solids content of 40% by weight. The additions may also be more finely graduated, for example one tenth of C may be added after every 5% increase in the solids content.

The time-solids content relation for this series of tests is shown in Table VII.

It can be seen from Table VII that the polymerization reactions take place much more quickly at elevated temperature.

According to M. Morton and P. P. Salatiello (J. Polymer Science, 8, 215–224 (1952), cf. page 22), the growth constant $K_w$ of the polymerization of butadiene shows the following dependence on temperature:

$$K_w = 1.2 \cdot 10^8 \exp(-9300/R \cdot T)[\text{l} \cdot \text{mol}^{-1} \cdot \text{sec}^{-1}]$$

Accordingly, the activation energy of the growth reaction is 9300 cal. If the corresponding value in cal (1.986 cal) is used for the gas constant, the following result is obtained:

$$K_w = 1.2 \cdot 10^8 \exp(-9300/(1.986 \cdot (273.15 + °C.)))$$

| Temp. [°C.] | $K_w$ |
|---|---|
| 0 | ~4 |
| 10 | 8 |
| 20 | 14 |
| 30 | 23 |
| 40 | 38 |
| 50 | 61 |
| 60 | 94 |
| 70 | 142 |
| 80 | 209 |
| 90° | 301 |
| 100 | 425 |

$$K_w: \frac{[\text{liter latex particle volume}]}{[\text{mol butadiene} \cdot \text{sec.}]}$$

(to be compared with $K_w$ of other monomers at 60° C.: Styrene: 176; Methacrylic Acid Methyl Ester: 367; See: B. Vollmert Grundriβ der Makromol. Chemie, Springer (1962) S. 66).

TABLE VI

| | Example No. | | | | |
|---|---|---|---|---|---|
| | 38 | 39 | 40 | 41 | |
| Polymerization temperature | 60 | 70 | 80 | 90 | |
| Deionized water (g) | 957.00 | 957.00 | 957.00 | 957.00 | |
| KOH, solid (g) | 1.72 | 1.72 | 1.72 | 1.72 | |
| Polybutadiene latex, 35% particle diameter 100 nm (g) | 522.00 | 522.00 | 522.00 | 522.00 | |
| Na salt of disproportionated abietic acid, aqueous 10% solution (g) (Dresinate ® 731) | 73.00 | 73.00 | 73.00 | 73.00 | A |
| Tert.-dodecyl mercaptan (g) | 4.93 | 4.93 | 4.93 | 4.93 | |
| $K_2S_2O_8$ solution, 2.5% (g) (in $H_2O$) | 164.4 | 82.2 | 41.1 | 20.7 | |
| Butadiene (g) | 1461.0 | 1461.0 | 1461.0 | 1461.0 | B |
| Dresinate ® 731: Na salt of disproportionated resinic acid, aqueous 10% solution (g) | 173.5 | 173.5 | 173.5 | 173.5 | C |
| $K_2S_2O_8$ solution, 2.5% | — | 82.2 | 123.3 | 143.7 | |
| Coagulate (g) | none | none | 25 | none | |
| Solids content % | approx. 50% | approx. 50% | approx. 50% | approx. 50% | |
| pH value | 11.1 | 10.4 | 11.2 | 11.2 | |
| Flow time, DIN 53 211 [secs.] (4 mm diameter nozzle) | 21.7 | 21.4 | 26.4 | 24.9 | |
| LCS diameter [nm] (laser | 210 | 200 | 198 | 200 | |

TABLE VI-continued

| | Example No. | | | |
|---|---|---|---|---|
| | 38 | 39 | 40 | 41 |
| correlation spectr.) | | | | |
| DAN | 193.3 | 164 | 169 | 139 |
| DAL | 195.6 | 171 | 174 | 157 |
| DAF (see DIN 53 206) | 199.8 | 177 | 178 | 173 |
| DAV | 208.1 | 181 | 181 | 184 |
| DVN | 196.2 | 171 | 173 | 156 |
| D0* | 157 | 95.2 | 101 | 80 |
| D10 | 180 | 153 | 157 | 104 |
| D20 | 184 | 173 | 172 | 181 |
| D30 | 186 | 174 | 175 | 189 |
| D40 | 188 | 178 | 178 | 192 |
| D50 | 1?0 | 184 | 181 | 195 |
| D60 | 193 | 188 | 187 | 196 |
| D70 | 197 | 190 | 189 | 197 |
| D80 | 204 | 194 | 193 | 200 |
| D90 | 223 | 199 | 200 | 206 |
| D100 | 585 | 218 | 218 | 229 |
| DAV/DAN | 1.08 | 1.10 | 1.07 | 1.32 |

*Particle-Size Distribution according to measurements with the ultracentrifuge (W. Scholtan H. Lange Koll. Z.Z. Polymere, 250, 782–796 (1972)).

TABLE VII

Time-solids content relation

| | E = | | | |
|---|---|---|---|---|
| | 38 | 39 | 40 | 41 |
| Time [h] | 60° C. | 70° C. | 80° C. | 90° C. |
| | S = | | | |
| 1 | 12.5 | 14.5 | 15.8 | 20.5 |
| 2 | 13.6 | 17.0 | 20.0 | 27.5 |
| 3 | 15.0 | 20.0 | 23.5 | 34.0 |
| 4 | 16.0 | 23.0 | 27.5 | 40.0 |
| 5 | 17.5 | 26.0 | 31.5 | 46.5 |
| 6 | 18.8 | 29.0 | 35.5 | 49.0 |
| 7 | 20.0 | 32.0 | 39.0 | 50.0 |
| 8 | 21.6 | 35.0 | 38.5 | |
| 9 | 22.8 | 38.0 | 46.5 | |
| 10 | 24.0 | 40.5 | 48.7 | |
| 11 | — | — | 50.0 | |
| 15 | 31.0 | 45.0 | | |
| 20 | 39.0 | 48.5 | | |
| 25 | 44 | 50.0 | | |
| 32 | 49.5 | | | |

E = Example No.
S = solids content in % by weight (latex)

Accordingly, an increase in temperature of 10° accelerates the reaction velocity by a factor of approximately 1.5 for a constant monomer concentration and radical concentration in the latex particle.

Table VI shows that, starting from the same seed latex in different ways at 60° to 90° C. there are resulting final latices wherein the average latex particle diameter is approximately 200 nm.

An attempt to produce final latices with average particle diameters of 400 nm from seed latices having an average particle diameter of 100 nm by increasing monomer input, fails as new latex particles are formed when the average particle size of approximately 200 nm is reached. This is true where DRESINATE ® is used as emulsifier and potassium peroxidisulfate as initiator, the formation of new latex particles being the more pronounced, the higher the polymerization temperature and the higher the amount of emulsifier necessary to prevent the formation of coagulate.

EXAMPLES 42 to 49

Efforts for the Production of Large Particle Size Polybutadiene Latices by Semicontinuous Seed Polymerization The polybutadiene latices with particle diameters of approximately 200 nm produced in accordance with Examples 38 to 41, Table VI, are used as seed latices (cf. Table VIII, line 6). A same similar polymerization process as in Examples 38 to 41 is applied. The same seed latex is now "enlarged" using the Na salt of disproportionated abietic acid (DRESINATE ® 731) and then as a comparison, a preferred emulsifier according to the invention (dipotassium salt of the acid of formula 1 (cf. Table I) by polymerizing butadiene onto the seed latex. One third of the emulsifier-activator solution C is added when the latex solids content is 20%, one third when the latex solids content is 30% and the remainder when the latex solids content is 40%.

It can be seen from Table VIII that the amount of coagulate is always lower where the emulsifier according to the invention is used than where DRESINATE ® is used.

In addition, particle size determination (by means of ultracentrifuge analysis of the dispersions) as indicated in Table VIII, shows that, the emulsifier according to the invention yields larger average latex particle diameters and a narrower latex particle diameter distribution. Accordingly, the DAV/DAN ratio of the final latices is closer to 1.0 where the emulsifiers according to the invention are used than where DRESINATE ® is used.

TABLE VIII

| Temperature | 60° C. | | 70° C. | | 80° C. | | 90° C. | |
|---|---|---|---|---|---|---|---|---|
| Example No. | 42 | 43** | 44 | 45** | 46 | 47** | 48 | 49** |
| Deionized water | 973.8* | 973.8* | 1052 | 1052 | 1052 | 1052 | 1052 | 1052 |
| KOH, solid | 1.72 | 1.72 | 1.72 | 1.72 | 1.72 | 1.72 | 1.72 | 1.72 |
| Seed latex Example | 38 | 38 | 39 | 39 | 40 | 40 | 41 | 41 |
| 35% | 504.9* | 504.9 | 426.9 | 426.9 | 426.9 | 426.9 | 426.9 | 426.9 |
| 10% Dresinate 731 solution | 39.6* | — | 37.6 | — | 41.0 | — | 41.7 | — |
| 10% solution emulsifier | — | 39.6 | — | 37.6 | — | 41.0 | — | 41.7 |

TABLE VIII-continued

| Temperature | 60° C. | | 70° C. | | 80° C. | | 90° C. | |
|---|---|---|---|---|---|---|---|---|
| Example No. | 42 | 43** | 44 | 45** | 46 | 47** | 48 | 49** |
| of formula 1 in Table I di-K-salt | | | | | | | | |
| Tert.-dodecyl mercaptan | 4.93* | 4.93 | 4.93 | 4.93 | 4.93 | 4.93 | 4.93 | 4.93 |
| $K_2S_2O_8$ solution, 2.5% | 164.3* | 164.3 | 82.2 | 82.2 | 41.1 | 41.1 | 20.6 | 20.6 |
| Butadiene | 1467* | 1467 | 1494 | 1494 | 1494 | 1494 | 1494 | 1494 |
| 10% Dresinate solution | 130.3* | — | 147.5 | — | 160.8 | — | 163.5 | — |
| 10% solution emulsifier 1, di-K-salt | — | 130.3 | — | 147.5 | — | 160.8 | — | 164.5 |
| $K_2S_2O_8$ solution, 2.5% | — | — | 82.2 | 82.2 | 123.3 | 123.3 | 143.7 | 143.7 |
| *All quantities in [g] | | | | | | | | |
| **According to the invention | | | | | | | | |
| Coagulate (g) | 43 | 20 | 64.5 | 5.6 | 101.5 | 2.0 | 69 | 44 |
| pH value | 11.5 | 12.0 | 11 | 11 | 10.7 | 11.0 | 11.5 | 12.0 |
| u = DAV/DAN | 1.41 | 1.03 | 1.45 | 1.04 | 1.19 | 1.04 | 1.29 | 1.04 |
| DAN* | 174.3 | 329.5 | 130.3 | 250.6 | 188.3 | 296.3 | 148.0 | 275.2 |
| DAL | 193.9 | 332.0 | 149.0 | 253.6 | 203.4 | 300.2 | 162.0 | 278.0 |
| DAF | 218.5 | 334.8 | 169.8 | 257.0 | 215.2 | 304.2 | 176.4 | 281.8 |
| DAV | 245.8 | 338.2 | 188.9 | 260.9 | 224.2 | 308.3 | 191.2 | 287.2 |
| DVN | 194.7 | 332.1 | 148.8 | 253.7 | — | 300.2 | — | 278.4 |
| D0    ITGV** | 104 | 270 | 84 | 207 | 102 | 236 | 85 | 219 |
| D10 | 136 | 296 | 95 | 224 | 195 | 259 | 127 | 242 |
| D20 | 157 | 314 | 117 | 231 | 204 | 271 | 162 | 253 |
| D30 | 186 | 322 | 174 | 236 | 207 | 281 | 166 | 263 |
| D40 | 209 | 327 | 181 | 242 | 212 | 293 | 169 | 277 |
| D50 | 236 | 332 | 191 | 249 | 219 | 312 | 172 | 287 |
| D60 | 265 | 337 | 202 | 263 | 227 | 322 | 181 | 294 |
| D70 | 293 | 343 | 214 | 278 | 233 | 329 | 198 | 300 |
| D80 | 319 | 350 | 228 | 288 | 244 | 337 | 226 | 306 |
| D90 | 350 | 364 | 248 | 300 | 275 | 345 | 265 | 314 |
| D100 | 407 | 555 | 298 | 785 | 312 | 780 | 353 | 1600 |

*Definitions according to DIN 53 206
**ITGV - integral latex particle diameter distribution, as determined by the ultracentrifuge technique
***According to the invention

EXAMPLE 50

According to the Invention

Polybutadiene Latex, Particle Diameter d = 200 nm

The following materials are introduced in the absence of oxygen into a 6 liter stainless steel autoclave (operating pressure up to 20 bar) equipped with an infinitely variable paddle stirrer (150 r.p.m.) and internal temperature control:

| | |
|---|---|
| Deionized water | 2282.00 g |
| Emulsifier of formula 1, Table I, di-K-salt | 50.00 g |
| Tert.-dodecyl mercaptan | 5.00 g |
| 2.5% aqueous potassium peroxodisulfate solution | 155.00 g |
| KOH, solid (100%) | 1.15 g |
| Butadiene | 1650.00 g |

The mixture is heated to 65° C. and polymerized for 32 hours until pressure drops down.

Approx. 4000 g of a coagulate-free 39–40% polybutadiene latex are obtained. The latex can be freed from residual monomers without foaming by distilling off approximately 10% of the water in the latex and replacing it with deionized water rendered alkaline with KOH to pH 9.

Ultracentrifuge particular size analysis of the latex showed the following particle diameter distribution:

| | | | |
|---|---|---|---|
| D0 | 90 | DAN | 166.4 |
| D10 | 132 | DAL | 177.1 |
| D20 | 192 | DAF | 185.3 |
| D30 | 196 | DAV | 191.1 |
| D40 | 197 | DVN | 176.1 |
| D50 | 198 | | |
| D60 | 198 | | |
| D70 | 199 | | |
| D80 | 201 | DAV/DAN = | 1.15 |
| D90 | 208 | | |
| D100 | 224 | | |

EXAMPLE 51

According to the Invention

Production of a Polybutadiene Latex, Average Particle Diameter DAV 250 nm, by the Continuous Addition Process The following materials are introduced into a 40 liter stainless steel autoclave (operating pressure up to 25 bar) equipped with an infinitely variable paddle stirrer (120 r.p.m.) and internal temperature control:

| | |
|---|---|
| Deionized water | 15 350.00 g |
| Potassium hydroxide, solid | 87.50 g |
| Emulsifier resin of formula 1, Table I (finely powdered) | 332.50 g |

The pH value of the clear aqueous solution is approximately 11.5.

After repeated evacuation and purging with nitrogen, the autoclave is re-evacuated and a mixture of

| | |
|---|---|
| butadiene | 2900.00 g |
| tert.-dodecyl mercaptan | 9.00 g | is subsequently introduced. The mixture is heated with stirring to 65° C., after which polymerization is initiated by the introduction under pressure of a solution of

| | |
|---|---|
| potassium peroxodisulfate in water, 2.5% | 1043.00 g |

After a solids content of 6–10% by weight has been reached,

| | |
|---|---|
| butadiene | 8250.00 g |
| tert.-dodecyl mercaptan | 26.00 g | is uniformly introduced over a period of 55 h.

After addition of the butadiene, the mixture is stirred at elevated temperature (70° C.) until the pressure has fallen to 4 bar.

The crude latex then has a solids content of approximately 39–40%.

The total polymerization time is approximately 75 hours.

The butadiene still present in the autoclave is largely removed by venting the reactor overhead at approximately 50° C., followed by condensation, and the crude latex is subjected to steam distillation until no more butadiene and divinyl cyclohexene can be detected in the latex.

The demonomerized latex is freed from slight precipitations by filtration through 50μ mesh sieves. It has an average latex particle diameter (DAV of 250 nm, as determined by the ultracentrifuge technique; the polymer has a swelling index of 25 and a gel content of 85%.

EXAMPLE 52

Polybutadiene latex, particle diameter 370 nm (according to the invention)

The following materials are introduced into a 6 liter stainless steel autoclave corresponding to Example 50:

| | |
|---|---|
| Deionized water | 2524.0 g |
| Emulsifier of formula 9 (Table I) dipotassium salt | 55.0 g |
| Tert.-dodecyl mercaptan | 5.7 g |
| 2.5% aqueous $K_2S_2O_8$ solution | 172.0 g |
| KOH, solid (100%) | 1.3 g |
| Butadiene | 1832.0 g |

Polymerization is carried out for 100 hours at 65° C., after which the temperature has fallen to around 6 bar. A 39% polybutadiene latex having an average particle diameter DAV of 376 nm is obtained.

Results of ultracentrifuge analysis:

| | | | |
|---|---|---|---|
| D0 | 339 | DAN | 371.2 |
| D10 | 353 | DAL | 372.1 |
| D20 | 358 | DAF | 373.5 |
| D30 | 361 | DAV | 375.7 |
| D40 | 364 | DVN | 372.3 |
| D50 | 367 | DAV/DAN = | 1.01 |
| D60 | 370 | | |
| D70 | 373 | | |
| D80 | 375 | | |
| D90 | 383 | | |
| D100 | 1000 | | |

EXAMPLE 53

Production of a polybutadiene latex, average particle diameter 350 nm (seed inflow process) (according to the invention)

The following are introduced in the absence of oxygen into a 40 liter stainless steel autoclave (operating pressure up to 25 bar) equipped with an infinitely variable paddle stirrer (120 r.p.m.) and internal temperature control:

| | |
|---|---|
| Deionized water | 8000.00 g |
| Potassium chloride | 30.00 g |
| Emulsifier 1 (Table I), diacid powdered | 15.50 g |
| Potassium persulfate $K_2S_2O_8$, solid | 10.00 g |
| Caustic potash KOH, solid (100%) | 7.80 g |
| Polybutadiene latex, particle diameter 100 nm, 35% (Example 37) | 507.00 g |

The autoclave is evacuated three times, the vacuum being eliminated with nitrogen. After re-evacuation,

| | |
|---|---|
| butadiene | 3000.00 g |
| n-dodecyl mercaptan | 9.00 g | are drawn into the vacuum from a supply vessel.

The mixture is then heated to 60° C. After a latex solids content of 10% has been reached, the following monomer streams are added over a period of 70 hours:

| | |
|---|---|
| Activator-emulsifier inflow (clear solution) | |
| Deionized water | 7113.00 g |
| Potassium peroxodisulfate $K_2S_2O_8$ | 30.00 g |
| Emulsifier 1 (Table I) diacid | 180.00 g |
| Caustic potash, KOH, solid | 8.90 g |
| Monomer inflow (homogeneous solution) | |
| Butadiene | 13 000.00 g |
| n-Dodecyl mercaptan | 39.00 g |

At the beginning of the addition, the polymerization temperature is kept constant at 70° C. After a polymerization time of approximately 90 hours, an approximately 50% polybutadiene latex has formed. There are no significant quantities of coagulate either in the autoclave or in the latex.

The latex can be demonomerized without foaming. The polymer has a gel content of approximately 75 to 80% and a swelling index of 25 to 30. The particle diameter distribution of the latex is very narrow and the mean particle diameters are approximately 350 nm, as can be seen from FIG. 1 (electron micrograph, contrasting with osmium tetroxide).

The latex, which can also be produced on an industrial scale in this way, is suitable as a graft base for ABS polymers and other high-impact thermoplastic molding compounds (cf. Example 57).

EXAMPLE 54

Seed inflow process of Example 53 with another emulsifier according to the invention The procedure is as in Example 53, except that the emulsifier described there is replaced by the same quantity in grams of an emulsifier having the idealized structure 7 in Table I in the form of the dipotassium salt.

After a polymerization time of approximately 100 hours, an approximately 50% polybutadiene latex has formed. Its particle size distribution was determined by the ultracentrifuge technique:

| | | | |
|---|---|---|---|
| D0 | 334 | DAN | 418.6 |
| D10 | 393 | DAL | 422.0 |
| D20 | 398 | DAF | 427.0 |
| D30 | 402 | DAV | 435.4 |
| D40 | 406 | DVN | 422.5 |
| D50 | 410 | DAV/DAN = 1.04 | |
| D60 | 415 | | |
| D70 | 422 | | |
| D80 | 432 | | |
| D90 | 490 | | |
| D100 | 1000 | | |

The polymer has a gel content of 70% and a swelling index of 30.

This latex is also eminently suitable as a graft base for the production of high-impact molding compounds.

EXAMPLE 55

Seed Inflow Polymerization Process Using An Emulsifier according to the invention and a redox initiator system The following are introduced into an autoclave corresponding to Example 53:

| | | |
|---|---|---|
| Deionized water | 8000.00 | |
| Emulsifier of formula 1 in Table I, diacid, powdered | 15.50 | |
| Potassium hydroxide, solid, 100% | 3.50 | A |
| Polybutadiene latex, particle diameter 100 nm (Example 37) | 507.00 | |
| Storage vessel I | | |
| Butadiene | 1500.00 | |
| n-Dodecyl mercaptan | 9.00 | B |
| Storage vessel II | | |
| Buadiene | 1500.00 | |
| p-Menthane hydroperoxide, 50% | 7.00 | C |
| Storage vessel III | | |
| Deionized water | 490.00 | |
| Sodium formaldehyde sulfoxylate (Rongalit C ®), solid | 1.50 | D |
| Fe(II))-ethylenediamine tetraacetic acid complex, 0.05 molar solution in water | 5.00 | |
| Storage vessel IV | | |
| Deionized water | 6623.00 | |
| Rongalit C ®, solid | 4.50 | |
| Emulsifier acid of formula 1, Table I | 170.60 | E |
| KOH, solid | 38.60 | |
| Storage vessel V | | |
| Butadiene | 8654.00 | |
| n-Dodecyl mercaptan | 39.00 | F |
| Storage vessel VI | | |
| Butadiene | 4347.00 | |
| p-Menthane hydroperoxide, 50% | 29.80 | G |

After mixture A has been introduced, the autoclave is repeatedly evacuated and the pressure equalized with nitrogen. After re-evacuation, mixtures B and C are drawn in.

The autoclave is heated to an internal temperature of 70° C., after which D is added.

After a solids content in the crude latex of approximately 7 has been reached, streams E, F and G are introduced into the reactor over periods of 70 hours, 55 hours and 60 hours, respectively.

After a polymerization time of 100 hours, the polymerization reaction is terminated, the crude latex is vented and demonomerized.

The latex particle diameter distribution of the coagulate-free, demonomerized latex appears as follows:

| | | | |
|---|---|---|---|
| D0 | 219 | DAN | 389 |
| D10 | 374 | DAL | 391 |
| D20 | 378 | DAF | 393 |
| D30 | 382 | DAV | 395 |
| D40 | 386 | DVN | 391 |
| D50 | 389 | | |
| D60 | 393 | | |
| D70 | 397 | | |
| D80 | 402 | DAV/DAN | 1.015 |
| D90 | 412 | | |
| D100 | 1100 | | |

The latex is eminently suitable as a graft base for the production of ABS polymers and other high-impact thermoplastics and shows further improved thermal stability compared with persulfate activation.

EXAMPLE 56

Comparison

The procedure is as in Example 53 except that, instead of the emulsifier according to the invention, the same quantity (in g) of DRESINATE ®731 is used.

After a polymerization time of approximately 80 hours, the pressure has fallen to around 3.5 bar and a latex having the following particle size distribution has formed:

| | | | |
|---|---|---|---|
| D0 | 117.5 | DAN | 170.5 |
| D10 | 144 | DAL | 179.2 |
| D20 | 156 | DAF | 190.2 |
| D30 | 165 | DAV | 203.2 |
| D40 | 174 | DVN | 179.8 |
| D50 | 183 | | |
| D60 | 196 | | |
| D70 | 233 | | |
| D80 | 268 | DAV/DAN = | 1.19 |
| D90 | 285 | | |
| D100 | 326 | | |

The latex has a gel content of approximately 95% and a swelling index of approximately 20. The latex is unsuitable as a graft base for the production of ABS polymers because the strength values of ABS moldings produced therewith are inadequate.

Figure 2:
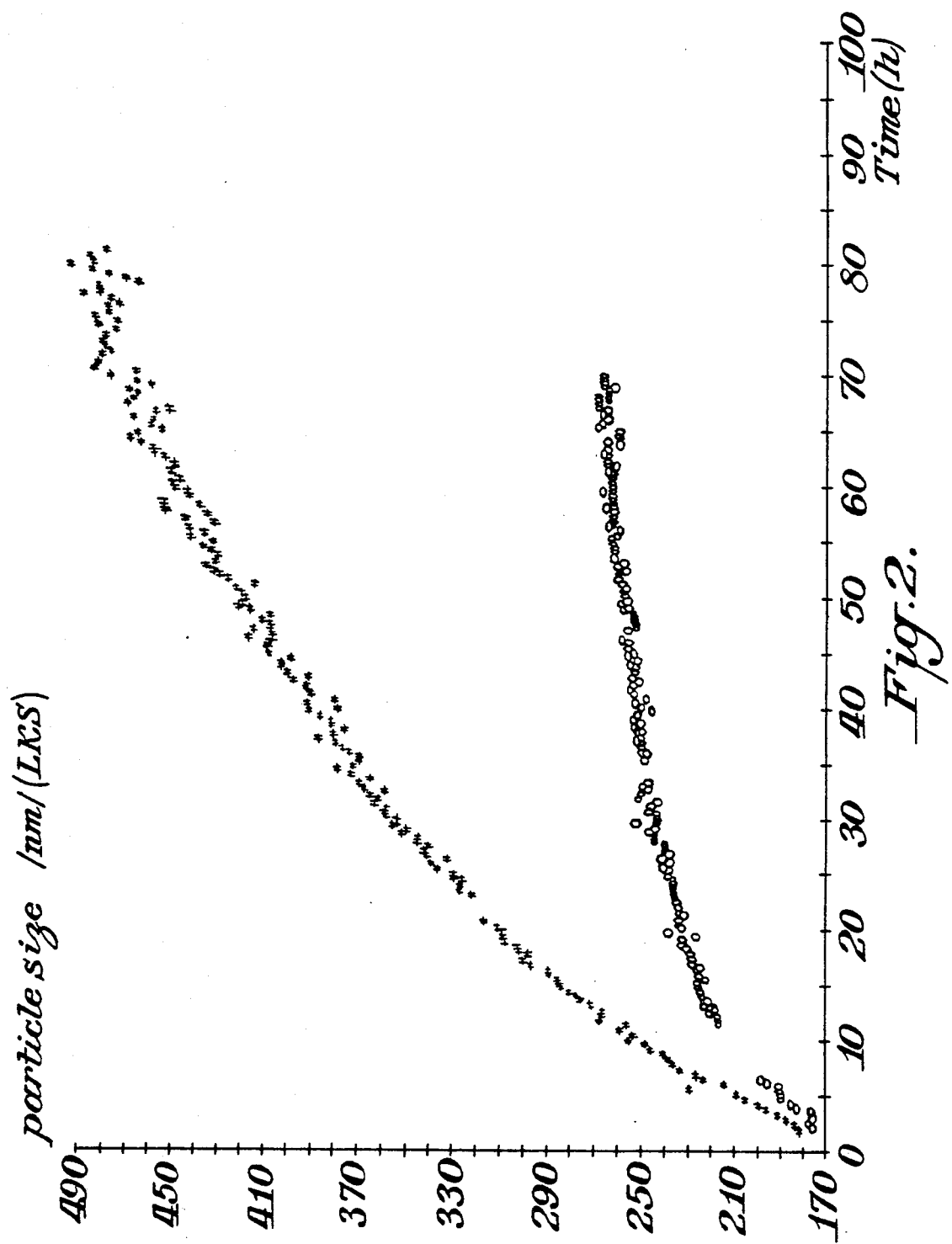
FIG. 2 is a graph representing the growth of the latex particle diameter as a function of time, wherein the open symbols show particle growth in accordance with the prior art and the cross symbols show particle growth in accordance with the invention.

FIG. 2 shows the evolution of the average latex particle diameter as a function of time on the basis of quasi-continuous measurements. Starting from the same seed latex, the particle size develops differently where the emulsifier according to the invention is used than where Dresinate is used.

The measurements were performed by laser correlation spectroscopy. The latex particle diameter determined by laser correlation spectroscopy is larger by a factor of 1.2 than the particle diameter determined by electron microscopy or by the ultracentrifuge technique.

Particulars of the on-line measurement of latex particles can be found, for example, in DE-OS 3 303 337.

EXAMPLE 57

According to the Invention

Graft Polymerization of a Styrene/Acrylonitrile Mixture Onto the Polybutadiene Latex of Example 53

50 Parts by weight polybutadiene (in the form of a latex having a solids content of 25% by weight prepared by dilution of the polybutadiene latex of Example 53 with deionized water) are heated under nitrogen to 63° C., followed by the addition of 0.5 part by weight $K_2S_2O_8$ (dissolved in 15 parts by weight water). A mixture of 36 parts by weight styrene and 14 parts by weight acrylonitrile and also 1.5 parts by weight of the sodium salt of disproportionated abietic acid (dissolved in 25 parts by weight water) is then introduced over a period of 4 hours during which the grafting reaction takes place. Following an after-reaction time, the latex is coagulated in a magnesium sulfate/acetic acid solution and the resulting powder is dried in vacuo at 70° C.

EXAMPLE 58

According to the Invention

Testing of a Mixture of the Graft Polymer Described in Example 57 with a Styrene/Acrylonitrile Copolymer and an α-Methyl Styrene/Acrylonitrile Copolymer The graft polymer described in Example 57 was mixed in an internal kneader with a styrene/acrylonitrile copolymer (72:28, $M_W$ approx. 115,000, $M_W/M_n-1 \leq 2$) or with an α-methyl styrene/acrylonitrile copolymer (72:28, $M_W$ approx. 75,000, $M_W/M_n-1 \leq 2$) in the ratios by weight shown in Table IX. 2 Parts by weight pentaerythritol tetrastearate and 0.1 part by weight of a silicone oil (based in each case on 100 parts by weight graft polymer+copolymer) were used as additives. After processing by injection molding, impact strength (DIN 53 453), hardness (DIN 53 456), Vicat B softening point (DIN 53 460), MVI (DIN 53 735 u) and also natural color (after processing at 240° C. to 280° C.) and surface gloss (according to DE-AS 2 420 358) were determined, the results being shown in Table IX.

TABLE IX

Testing of the graft rubber described in Example 57

| Graft polymer of Example 57 [parts by weight] | Styrene/ acrylonitrile copolymer [parts by weight] | α-methyl styrene/ acrylonitrile copolymer [parts by weight] | RT $a_k$ [kJ/m²] | −40° C. $a_k$ [kJ/m²] | Hc [n/mm²] | Vicat B [°C.] | MVI [cm³/ 10 mins.] | Gloss | Natural color 240° C. | Natural color 260° C. | Natural color 280° C. |
|---|---|---|---|---|---|---|---|---|---|---|---|
| 30 | 70 | — | 15.3 | 9.4 | 103 | 102 | 8.0 | F-G | — | — | — |
| 40 | 60 | — | 16.8 | 12.3 | 84 | 100 | 5.9 | F | light | light | light |
| 50 | 50 | — | 17.2 | 14.6 | 67 | 96 | 4.1 | F | — | — | — |
| 20 | — | 80 | 10.4 | 5.5 | 113 | 115 | 2.0 | F | — | — | — |
| 30 | — | 70 | 13.9 | 7.6 | 93 | 113 | 1.6 | F | — | — | — |
| 40 | — | 60 | 16.7 | 10.3 | 77 | 109 | 1.2 | E-F | light | light | yellowish |

EXAMPLE 59

According to the Invention

Graft Polymerization of a Styrene/Acrylonitrile Mixture Onto the Polybutadiene Latex of Example 53

The procedure was as described in Example 57 except that, instead of the sodium salt of disproportionated abietic acid, 1.5 parts by weight of compound 1 in Table I in the form of the dipotassium salt was used as emulsifier in the graft reaction.

EXAMPLE 60

According to the Invention

Testing of a Mixture of the Graft Polymer Described in Example 59 with a Styrene/Acrylonitrile Copolymer and an α-Methyl Styrene/Acrylonitrile Copolymer The resin components described in Example 58 were used and the results are shown in Table X.

TABLE X

Testing of the graft rubber described in Example 59

| Graft polymer of Example 59 [parts by weight] | Styrene/ acrylonitrile copolymer [parts by weight] | α-methyl styrene/ acrylonitrile copolymer [parts by weight] | RT $a_k$ [kJ/m²] | −40° C. $a_k$ [kJ/m²] | Hc [n/mm²] | Vicat B [°C.] | MVI [cm³/ 10 mins.] | Gloss | Natural color 240° C. | Natural color 260° C. | Natural color 280° C. |
|---|---|---|---|---|---|---|---|---|---|---|---|
| 30 | 70 | — | 16.1 | 9.3 | 103 | 103 | 8.2 | F-G | — | — | — |
| 40 | 60 | — | 17.1 | 13.0 | 85 | 101 | 5.8 | F | very light | very light | light |
| 50 | 50 | — | 17.6 | 14.0 | 67 | 95 | 4.0 | F | — | — | — |
| 20 | — | 80 | 10.5 | 6.3 | 114 | 115 | 2.2 | F | — | — | — |
| 30 | — | 70 | 13.5 | 8.1 | 95 | 113 | 1.7 | F | — | — | — |
| 40 | — | 60 | 16.9 | 10.0 | 76 | 108 | 1.2 | E-F | very light | very light | light |

EXAMPLE 61

According to the Invention

Graft Polymerization of a Styrene/Acrylonitrile Mixture Onto the Polybutadiene Latex of Example 56

50 Parts by weight polybutadiene (in the form of a latex having a solids content of 25% by weight prepared by dilution of the polybutadiene latex of Example 56 with deionized water) are heated under nitrogen to 63° C., followed by the addition of 0.5 part by weight $K_2S_2O_8$ (dissolved in 15 parts by weight water). A mixture of 36 parts by weight styrene and 14 parts by weight acrylonitrile and also 2 parts by weight of compound 1 in Table I in the form of the dipotassium salt (dissolved in 25 parts by weight water) is then added over a period of 4 hours during which the graft reaction takes place. Following an after-reaction time, the latex is coagulated in a magnesium sulfate/acetic acid solution and the resulting powder is dried in vacuo at 70° C.

EXAMPLE 62

According to the Invention

Testing of a mixture of the Graft Polymer described in Example 61 with a Styrene/Acrylonitrile Copolymer and an α-Methyl Styrene/Acrylonitrile Copolymer The components described in Example 58 were used in the quantities shown in Table XI which also shows the natural colors after processing at 240° C. to 280° C.

TABLE XI

| | Testing of the graft rubber described in Example 61 | | | | |
|---|---|---|---|---|---|
| Graft polymer of Example 61 [parts by weight] | Styrene/acrylotrile copolymer [parts by weight] | α-methyl styrene/acrylonitrile copolymer [parts by weight] | Natural color | | |
| | | | 240° C. | 260° C. | 280° C. |
| 40 | 60 | — | light | light | light |
| 30 | — | 70 | light | light | light yellowish |

EXAMPLE 63

Comparison

Graft Polymerization of a Styrene/Acrylonitrile Mixture onto the Polybutadiene Latex of Example 56

The procedure is as described in Example 1 except that, instead of the dipotassium salt of compound 1 in Table I, 2 parts by weight of the sodium salt of disproportionated abietic acid were used as emulsifier in the graft reaction.

EXAMPLE 64

Comparison

Testing of a Mixture of the Graft Polymer described in Example 63 with a Styrene/Acrylonitrile Copolymer and an α-Methyl Styrene/Acrylonitrile Copolymer The components described in Example 58 were used in the quantities shown in Table XII which also shows the natural colors after processing at temperatures of 240° C. to 280° C.

TABLE XII

| | Testing of the graft rubber described in Example 63 | | | | |
|---|---|---|---|---|---|
| Graft polymer of Example 63 [parts by weight] | Styrene/acrylotrile copolymer [parts by weight] | α-methyl styrene/acrylonitrile copolymer [parts by weight] | Natural color | | |
| | | | 240° C. | 260° C. | 280° C. |
| 40 | 60 | — | light | light | yellowish |
| 30 | — | 70 | light | yellowish | yellow |

We claim:

1. Reaction products of 1 mol of a cycloaliphatic diol corresponding to formula I $$HO-R-OH \qquad \text{I}$$

with 2 mols of cycloaliphatic carboxylic anhydrides corresponding to formulae II, III or a mixture thereof

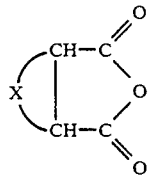

II

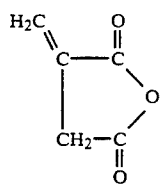

III in which
R is a cycloaliphatic hydrocarbon radical containing 6 to 20 carbon atoms to which the hydroxy groups are attached directly or via methylene groups and
X represents

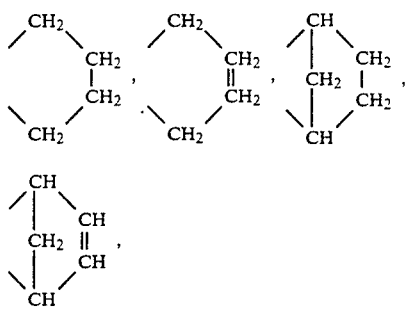

chemical bond
which reaction products are obtainable by fusion of the cycloaliphatic diol and of the cycloaliphatic carboxylic anhydride in an inert gas atmosphere at temperatures of from 100° C. to 250° C., and the alkali and ammonium salts of these reaction products.

2. A process for the production of the reaction products claimed in claim 1, wherein cycloaliphatic diols corresponding to formula I and one or more cycloaliphatic carboxylic anhydrides corresponding to formulae II, III or a mixture thereof are fused in an inert gas atmosphere at a temperature of up to 250° C.

3. An emulsifier constituting a reaction product claimed in claim 1, in the form of its alkali or ammonium salt.

* * * * *